Patented Feb. 17, 1931

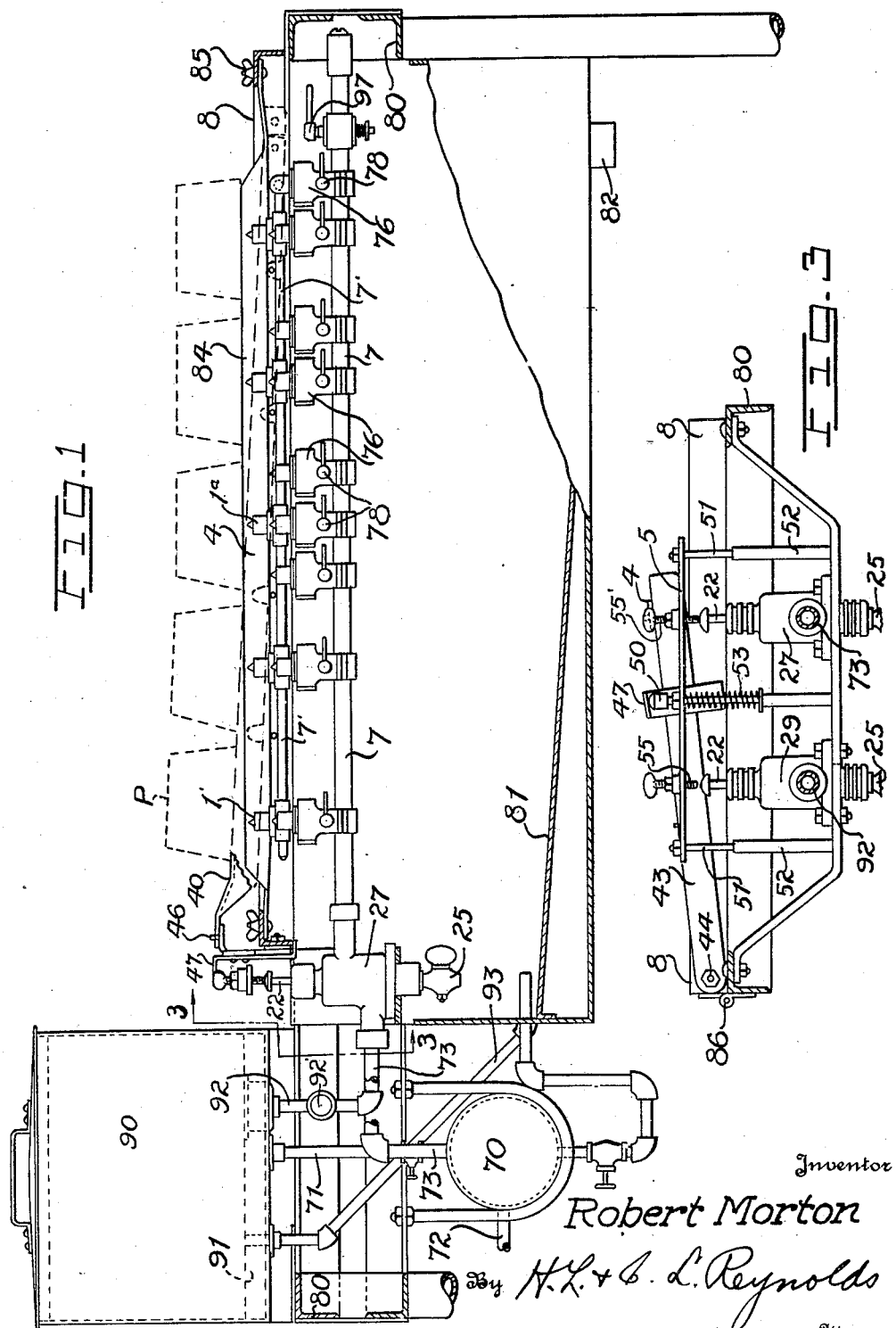

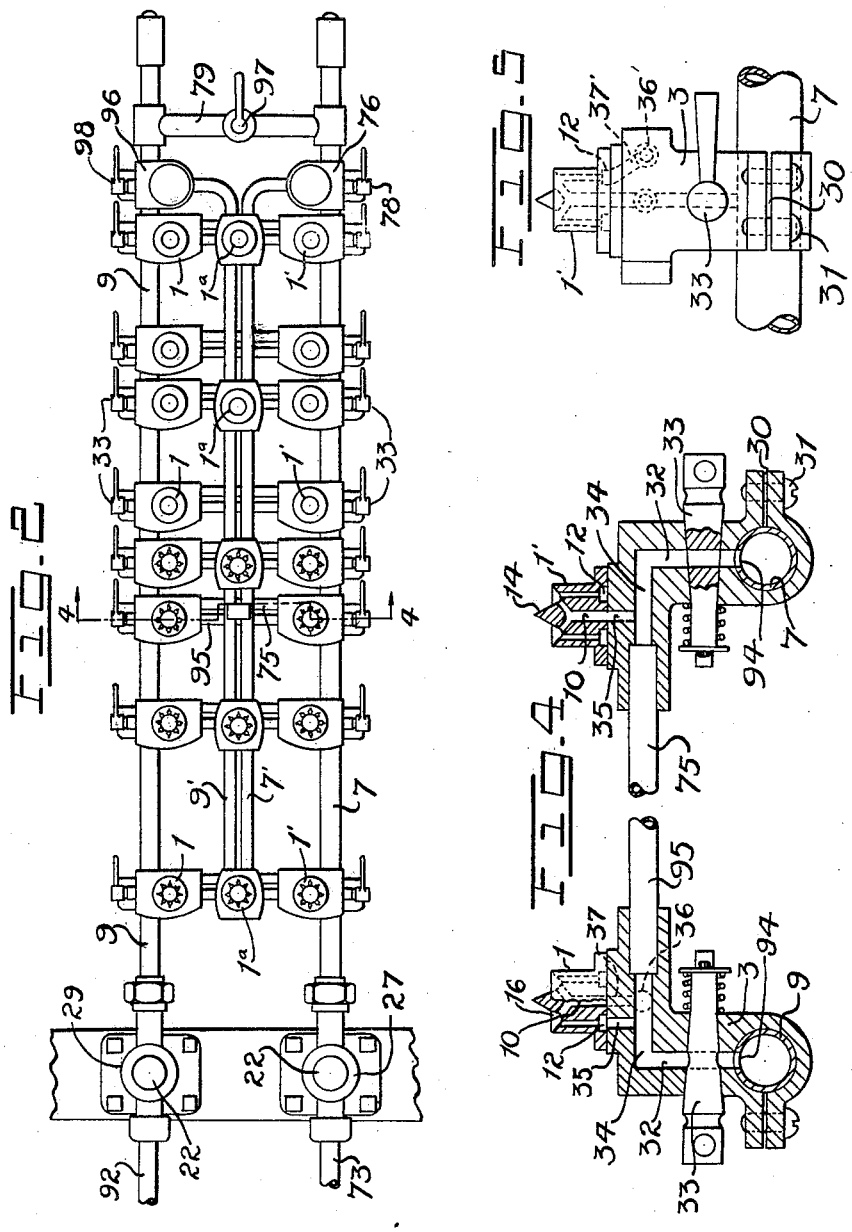

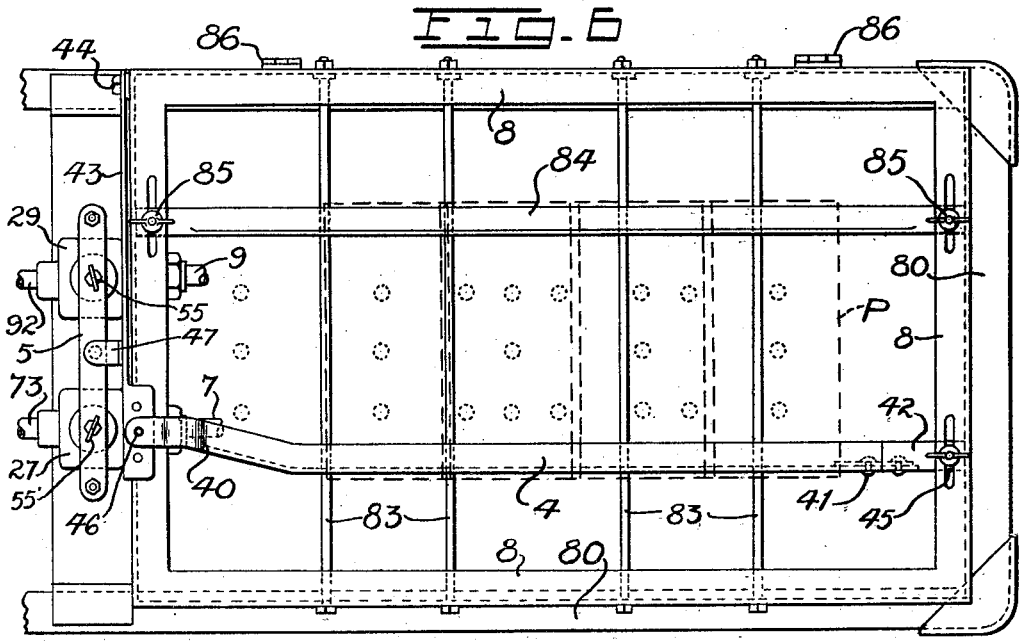
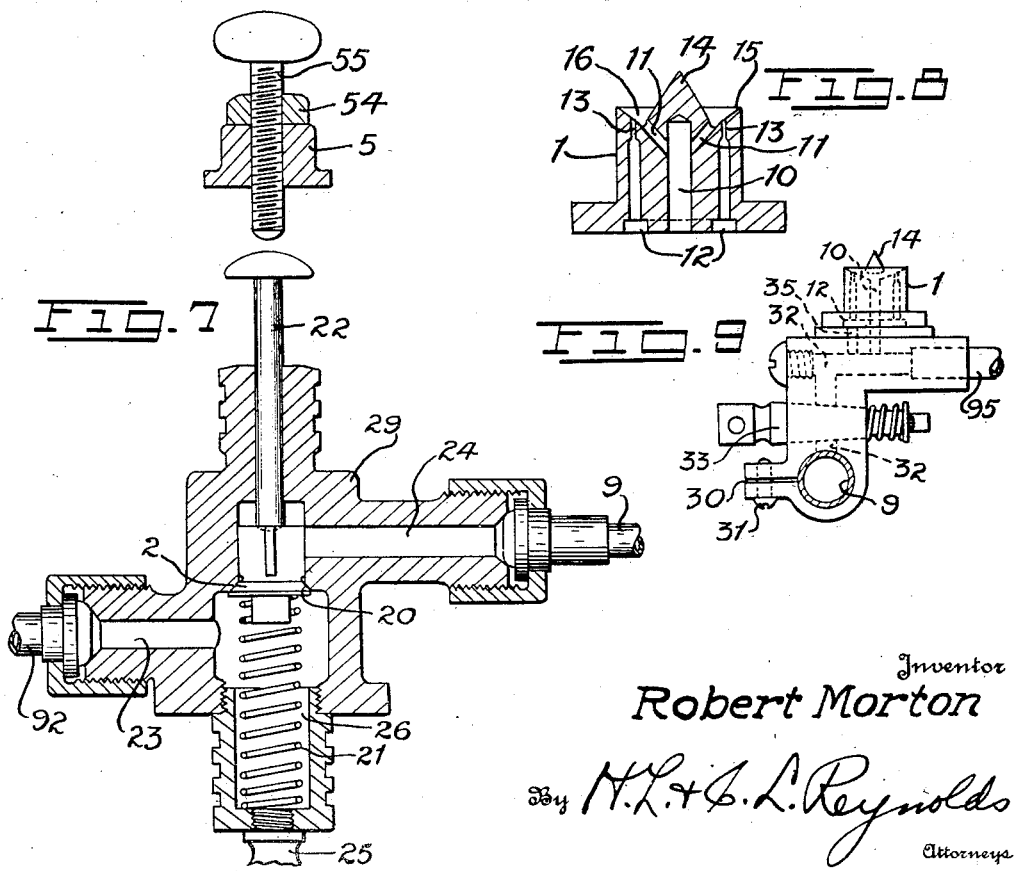

1,792,699

UNITED STATES PATENT OFFICE

ROBERT MORTON, OF VICTORIA, BRITISH COLUMBIA, CANADA, ASSIGNOR TO RENNIE-MORTON MANUFACTURING COMPANY LIMITED, A BRITISH COLUMBIA CORPORATION

PAN-GREASING MACHINE

Application filed May 9, 1927. Serial No. 189,874.

My invention relates to pan greasing machines of the type which employs a series of nozzles so placed relative to a pan or a strap of pans supported upon a pan rack of the machine, that pressure upon or movement of the pans causes the discharge from the nozzle of cleansing and greasing mediums, as steam and liquefied lard.

One object of the present invention is to provide such a machine in which a pan rack definitely fixed in position, as distinguished from sliding, tilting, or traveling belt racks, is employed for the reception of the pans, and to position them relative to the nozzles, but which machine includes a member independent of the pan rack and so connected with or forming part of the control means that pressure upon the pans, acting through this control member, determines the time of discharge of the cleansing and greasing mediums. Associated with this, it is an object to provide such a member which may be adjustable relative to the elements of the pan rack for accommodating different sizes of pans. It is also, of course, an object to provide such a mechanism which is simple and, therefore, reliable, and yet which will operate with the required nicety of adjustment and timing.

A further object is the provision of two supply conduits, one for the liquid grease and the other for a fluid pressure medium, such as steam, these conduits being arranged more or less in parallel, and each carrying discharge nozzles directly connected therewith but not directly connected with the other conduit or nozzles thereon, and the provision of means for interconnecting such nozzles, one on the steam conduit and one on the grease conduit, in pairs, whereby admission of a medium to one nozzle will cause admission of that medium to the other nozzle of the pair.

A further object, in connection with a machine of the construction just described, is the provision of a plurality of these pairs of nozzles, provided with means whereby selected nozzles or pairs may be cut out of action to permit other nozzles to function; in other words, a provide individual control means associated with each nozzle.

A further object is the provision of a nozzle which will distribute the grease, by means of a fluid pressure medium, evenly in all directions towards the position of the pans, so that the grease is evenly spread upon the surfaces thereof.

A further object is the provision of a new method for preparing baking pans and like devices for use, the method consisting in several successive steps, preferably controlled by means of one motion of the control apparatus.

Other objects, and especially such as relate to purely mechanical details, may best be ascertained by a study of the following specification, the claims which terminate the same, and of the drawings which form a part hereof, and in which my invention is shown in the form which I now prefer.

Figure 1 is, in general, a side elevation of my device with portions of the frame and drip pan shown in section, the better to illustrate the essential parts of the device;

Figure 2 is a plan view of the nozzle arrangement;

Figure 3 is a section on line 3—3 of Figure 1, illustrating the control mechanism;

Figure 4 is a section on line 4—4 of Figure 2;

Figure 5 is a detailed side elevation of a nozzle;

Figure 6 is a plan view of the pan rack, illustrating the relationship thereto of the control mechanism and the nozzles;

Figure 7 is an axial section through one of the control valves, the two control valves being alike;

Figure 8 is an axial section through an individual nozzle;

Figure 9 is an end elevation of the nozzle clamping and supporting means.

In common with machines of this general type, my invention involves the employment of a series of nozzles 1 or 1', which are in communication with sources of supply. The nozzle 1 may be in communication with a grease supply source, as the tank 90, and the nozzle 1', are then in communication with a steam supply source, as the receiver or tank 70, which is connected to a boiler or other source of supply of steam at relatively low pressure. Also, as in like devices, a rack 8 is supported on the frame 80, in such manner that pans supported on this rack are held in such position relative to the nozzles 1 and 1' that media discharged from these nozzles will be received on the interior surfaces of the pans, thus to be cleansed if steam is the medium discharged, or to be greased if the medium is grease. While the medium steam will be the only one referred to hereafter in this specification as the vehicle, or as the cleansing or sterilizing medium, it will be understood that any other suitable fluid pressure medium might be employed. Hence, the use of compressed air, for example, would be understood to be the full equivalent of the steam, for such purposes.

It is common practice in such devices to provide a movable pan rack, either slidable transversely, hinged at one edge to swing as a whole, or traveling as a continuous belt, for controlling the discharge of media from the nozzles; but according to my present invention, where the control is through movement of the pans positioned on the pan rack, the rack itself being fixed in position, the movement is transmitted to control valves by means independent of the pan rack and, themselves, constituting an important feature of the present invention. However, in order that the invention may best be understood, I will now proceed to a description of the various elements and their connections one to the other.

The grease reservoir 90 is suitably supported on the frame 80 and is adapted to receive a supply of grease, lard for example, which is reduced to a liquid state by some such means as the introduction of steam through the pipe 71 into the steam jacket 91. The liquid lard is drawn from the reservoir 90 through a supply pipe 92, past a valve 92', and finally past a control valve 29 to pass into a grease lateral 9. Here it communicates with nozzles 1 supported on the lateral 9, and in communication therewith, as will be hereinafter described. The tank 90 is arranged to be drained when necessary through a valve-controlled drain pipe 93 discharging into the botttom of the drip pan 81 carried by the frame, whence it may be drained by a drain 82 at the lowest point of the drip pan, and received into a bucket or other suitable receptacle placed therebeneath.

Steam is supplied to the container 70 through the supply pipe 72, and passes through a pipe 73 and through a control valve 27 into the steam lateral 7. The steam nozzles 1' are supported on the lateral 7 in the same manner as the nozzles which are supported on the grease lateral 9, and their construction and manner of support will be described in connection with the description of the nozzles 1.

The pan rack 8 is preferably a skeleton frame consisting simply of an outline frame, the sides of which are connected at intervals by rods 83, by means of which pans P may be supported so that they do not drop through to the under side of the pan rack. To assist in supporting the pans and in positioning them, a longitudinal bar 84 may be employed, this being adjustable transversely of the rack 8, as by means of the pin and slot connection illustrated at 85 at each end thereof. A similar bar may be employed at a position to engage the opposite ends of the pans to be supported on the rack, but inasmuch as the position of this bar would largely coincide with the position of the member which is engaged by the pins to initiate opening and closing of the control valves 27 and 29, this member may be substituted therefor. To enable ready cleaning of the drip pan and the nozzles, and of the pan rack itself, this may be hingedly supported upon the frame 80, as is indicated at 86, but it will be remembered that during operation of the device, the pan rack rests solidly upon the frame and is not itself movable.

The control valves 27 and 29 are alike in construction, and a description of one will suffice as a description of the other. In fact, any suitable form of valve may be employed for the purpose, it being only essential that the valve stem, arm, or other control member be movable from its normal position in response to movement of a control member, movement of which is initiated by the pan, and that this valve stem or arm return to its normal position to close the valve upon the completion of the movement of the pan. As shown in Figure 7, the valve 29 comprises a valve casing within which is a seat 20 for a valve 2, the valve being held to its seat by means of a spring 21. A stem 22, projecting from the casing 29 at its lower end, engages the valve 2 to unseat it when the stem is forced inward, thus affording communication between the inlet port 23 and the discharge port 24 of the valve casing. A drain cock 25 may be employed at the lowermost portion of the central well 26, by means of which water of condensation or any accumulation of grease may be removed. Thus it will be seen that upon pressure on the stems 22 of the valves 27 or 29, these valves will be opened to permit the passage of steam or grease from the supply pipes 73 or 92 to the laterals 7 or 9, respectively.

The form of nozzle might be varied considerably so far as the connections leading thereto are concerned, but I have found a peculiar form, which I will now proceed to describe, to be best adapted to distribute the grease evenly, and I, therefore, prefer this particular form. The nozzles 1 and 1' are alike, and a description of one will therefore suffice for the other.

The nozzle body proper is formed with a main steam passage 10 terminating in a number of radially and outwardly directed steam orifices 11. The body also has a main grease passage 12 in the form of an annular groove in its base, leading to a plurality of upwardly directed grease orifices 13, preferably placed closely adjacent to the steam orifices 11 and outwardly thereof.

At its top the nozzle is formed with a coned tip 14 and with an upwardly and outwardly inclined lip 15, whereby there is formed an annular groove 16, within which the orifices 11 and 13 terminate, and which groove receives grease which flows from the orifices 13. Upon the emission of steam from the orifices 11, any grease which is in the groove 16 is promptly expelled, and by reason of the inclination of the lip 15 and coned tip 14, it is spread substantially evenly in all directions. The suction effect of the steam passing over the grease orifices 13 draws the grease therefrom, provided these orifices are in communication with the grease reservoir at the time, and thus the steam acts as a vehicle to atomize and spread the grease in a thin film and in all upward directions. This suction effect is increased materially by the fact that the angle of the steam orifices 11 does not exactly coincide with the angle of the lip 15 and, due to the further fact that lard orifices 13 are slightly above the base of the groove 16, so that the steam will pass over these orifices with a little space to spare, thus causing a suction effect which would not be present were the steam to sweep over the entire mouth of the orifice 13.

These nozzles are supported upon a base 3, which is clamped or otherwise secured upon the laterals, as 9. The connection might be by means of a branch pipe from the laterals 9, but preferably is made as direct as possible, and, for that reason, the base member 3 is split as indicated at 30, whereby through the use of a clamping screw 31 it may be clamped upon the lateral so that its riser port 32 is in registry with an aperture 94 of the lateral 9. A cut off valve 33 in this riser port 32 of each base permits the cutting out of the nozzle supported on any particular base. A horizontal passage 34 communicates with the riser passage 32, and this in turn has a vertical passage or branch 35 which communicates either with the steam port 10 of the nozzle, or with the grease passage 12 thereof. The port 32 also is provided for the connection of a duct, as 75, connecting the steam nozzle with the lard nozzle of the same pair, or 95 connecting the grease nozzle with the steam nozzle with which it is paired.

It will be seen now that the ducts 75 and 95 connect the nozzles in pairs, one nozzle of each pair being directly connected to the steam lateral 7, and the other being directly connected to the grease lateral 9. Thus the supply of grease, for example, to the nozzle 1 is directly through the ports 32, 34 and 35, and thence into the annular port 12 of the nozzle 1, while the grease supply to the nozzle 1' is through the same ports of the nozzle 1 until it reaches the port 35, and then it follows the continuation of the port 34 to and through the duct 95, thence by this duct across to the paired nozzle 1', where it communicates with a port 36' in the base 3, which is in communication through a riser port 37' with the annular port 12 of the nozzle 1' (see Figure 5). Similarly, the supply of steam to the nozzle 1' is directly through the ports 32, 34 and 35, and thence into the central port 10 of the nozzle, but the supply to the nozzle 1 is through the continuation of the port 34, thence through the duct 75, and into a port 36 and up a riser port 37 to communication with the vertical port 10 of the nozzle 1.

In this arrangement it will be noted that the single valve 33, when closed, cuts off communication between the lateral on which its particular base 3 is mounted, and both of the paired nozzles 1 and 1'. Thus the grease supply to the paired nozzles may be cut off and the steam supply may be continued, affording a means for blowing out all of the connections in the two connected nozzles to cleanse them of steam and of any collection of grease. For this latter purpose, too, I have provided a cross pipe 79, controlled by a valve 97 which is normally closed, but which may be opened to place the entire system in free communication throughout, so that upon opening of the steam valve 27, the entire system may be cleansed and sterilized with steam.

The nozzles 1 or 1' have been described as separate from the bases 3, and this is true in the actual construction, but purely for convenience of construction. There is no essential reason why these two may not be made integral. Hence, the base 3 will in the specification and claims be understood as a part of the nozzle itself, except as otherwise specified.

It will be noted that the pairs of nozzles 1 and 1' are arranged in various spaced relations. Note especially Figures 1, 2 and 6. Baking pans are frequently arranged with different spacings, that is to say, there are standard straps of pans, some straps of four and others of five pans, all permanently secured together, but the width of these pans and the spacing between them varies. In consequence, it is necessary to provide such a machine (unless intended for use only on one standard size and spacing of pans), to accommodate the several sizes and spacings. Thus, for five pans to the strap, the third, fifth and seventh pairs of nozzles, as seen in Figure 2, may be closed off, and the remainder used. For a strap of four pans, the first, second, fourth and seventh pairs of nozzles may be closed off and the remainder employed. Single pairs only need be used for single pans. The rack, as will be seen in Figure 6, is especially adapted to receive the pans in proper position relative to the nozzles therebeneath, the positions of these nozzles being indicated by the dotted circles, and the positions of the pans being indicated by the dash lines. When five pans to the strap are employed, as is the usual practice, the pans may be positioned by some such means, as is best illustrated in Figure 1, where a break is provided at 40 in a member 4, the use of which will be described hereafter, this serving as a stop to position the pans properly relative to the nozzles.

It will also be noted that the laterals 7 and 9 have what is in effect a continuation, consisting of the parallel pipes 7' and 9', on both of which are mounted the nozzles 1ª. These may be mounted and connected in all essential respects in the same manner as the nozzles 1 and 1' heretofore described. Communication to the conduits 7' and 9' may be controlled by means of valves 78 and 98, respectively, supported in bases 76 and 96 clamped upon the respective laterals in much the same manner as the bases 3 are clamped thereon.

It now remains to describe the manner in which the valves 27 and 29 are controlled by means of pressure upon the pans to permit the discharge of the cleansing and sterilizing steam, and of the grease from the several nozzles, on the pans. The member 4 is in effect a longitudinal bar pivotally supported at 41 upon a member 42 secured in the pan rack 8. This may be adjustable transversely of the pan rack, as by means of the pin and slot connection 45. At its other end, the bar 4 is connected with a lever 43 pivoted at 44 upon the pan rack. The connection of the bar 4 to this lever 43 may be by means of pins 46 upstanding from the lever 43 and engageable within a hole provided in the end of the bar 4. By providing several of these pins 46, this end of the bar can be adjusted commensurate with the adjustment of its opposite end, that is to say, of its pivot member 42 at 45.

The lever 43, which is constrained to limited vertical movement by means of the movement of the bar 4, carries a presser member 47, which is positioned to engage a head 50 upon a transverse bar 5. This bar 5 is suitably guided for vertical movement, as, for example, by pins 51 received in vertical tubes 52 carried upon the frame 80. A spring 53 serves to maintain the bar 5 normally elevated, and this spring preferably has sufficient strength to maintain the lever 43 and the longitudinal bar 4 in normally upraised position, in addition to the bar 5.

Carried by the bar 5 are contact members positioned above the valve stems 22, and adapted, when the bar 5 is depressed, to depress these stems 22 to open the valves connected therewith. Such members are preferably adjustable, and I have, therefore, shown the set bolts 55 and 55', the bolt 55 in registry with the stem of the steam valve, and the bolt 55' in registry with the stem of the lard valve 27. Suitable means are provided to hold these bolts in adjusted position, such as the set nuts 54.

It will be observed that only the bolt 55' rests upon the stem of the valve 27. It need not rest thereon, of course, but at any event the bolt 55' comes closer to its valve stem than the bolt 55, which operates the corresponding valve. As a result of this, pressure of the pans upon the bar 4, acting through the arrangement just described, first causes pressure upon the stem of the valve 27 and this causes discharge of steam through the various pipes, laterals, ducts and nozzles, whereby the pans in position above the nozzles are sterilized and any crumbs are blown therefrom. Inasmuch as the grease orifices of the nozzles are not in communication with the grease reservoir, the stem has no effect in drawing forth the grease at this stage of the operation.

Continued pressure of the pans on the bar 4 (and, of course, in operation this would almsot instantaneously follow the discharge of steam), causes the bolt 55 to contact with the stem of the grease valve 29, the nozzles would be placed in communication with the grease reservoir. Now, the suction of the steam past the grease orifices 13 will tend to withdraw the grease therefrom and to atomize this grease, and the mixture of grease and steam will be blown upon the surfaces of the pans. Pressure on the pans is now relieved and the spring 53 returns the parts to their normal postion, the valves being closed by the self-contained springs 21. However, in closing, the grease valve 29 is first closed, cutting off the supply of grease to the nozzles, but prior to the cutting off of the supply of steam. This results in a final discharge of steam only, just prior to closing of valves. The result is that the live steam, acting upon the grease already deposited upon the pans, will spread the grease in an even film, rather than in globules, this action occurring both by reason of the force of the steam and by reason of its temperature.

Thus the pans are prepared for use by a method which I deem to be new, that is to say, they are first cleansed by the discharge of steam from a nozzle, followed by discharge of grease with steam as the vehicle from the same nozzle, and finally the grease is spread by the discharge of steam alone, still from the same nozzle. The action is continuous and requires but little time and requires no movement of the pan from point to point to receive the several differing media.

A device thus made is simple and cheap to construct, and will operate to cleanse and grease pans quickly and with a minimum of effort. It is easily cleansed, both inside and out.

What I claim as my invention is:

1. In a machine for greasing baking pans and the like, in combination, a grease supply source, a nozzle, a fixed pan-receiving rack, and nozzle control means positioned to be engaged by a pan supported on said rack, and operable by such engagement to spray grease from said nozzle into the pan.

2. In a machine for greasing baking pans and the like, in combination, a grease supply source, a plurality of nozzles spaced to correspond to the spacing between a strap of baking pans, a fixed pan-receiving rack adapted to support a strap of pans with each pan thereof in position to receive material from its respective nozzle, and nozzle control means including a member positioned to be engaged by any one of the pans in a strap supported on said rack, and operable by such engagement to spray grease from said nozzles upon the several pans.

3. In a greasing machine for the purpose specified, in combination, a grease supply source, a fluid pressure supply source, nozzles having supply communication with both the grease supply and fluid pressure supply, control means interposed between the fluid pressure supply source and said nozzles, and a separate control means interposed between the grease supply source and said nozzles, and a common operating means for both of said control means disposed and arranged to operate first upon the fluid pressure medium control means to discharge such medium from the nozzles upon the pans, to first cleanse them, and then to operate upon the grease supply control means, whereby to discharge grease upon the precleansed pans.

4. In a greasing machine for the purpose specified, in combination, a grease supply source, a fluid pressure source, nozzles having supply communication with both the grease supply and the fluid pressure supply, separate control means interposed between each of the grease supply and fluid pressure supply sources and said nozzles, a fixedly positioned pan rack for positioning pans to receive the matter discharged from said nozzles, and operating means for said control means including a member engaged by a pan and actuated by pressure transmitted therethrough, said operating means being disposed and arranged, relative to said control means, to cause the nozzles to discharge in succession the fluid pressure medium to cleanse the pans, and then grease to coat them.

5. In a greasing machine for the purpose specified, in combination, a grease supply source, a fluid pressure supply source, nozzles having supply communication with both the grease supply and the fluid pressure supply, control means interposed between each supply source and said nozzles, a pan rack for positioning pans to receive the matter discharged from said nozzles, operating means for said control means including a member engaged by a pan and actuated by pressure transmitted therethrough to discharge in succession the fluid pressure medium to cleanse the pans, and then grease to coat them, and means for adjusting the relative timing and amount of discharge of each medium.

6. In a greasing machine for the purpose specified, in combination, a grease supply source, a fluid pressure supply source, nozzles having supply communication with both the grease supply and the fluid pressure supply, control means interposed between each supply source and said nozzles, a fixedly positioned pan rack for positioning pans to receive the matter discharged from said nozzles, and operating means for said control means including a member engaged by a pan and actuated by pressure transmitted therethrough, and disposed and arranged with respect to both said control means to cause them to discharge in succession to fluid pressure medium to cleanse the pans, and then grease to coat them, and finally upon release of the control means to discharge the fluid pressure medium only, to spread the grease coating evenly.

7. In a machine for greasing baking pans, a skeleton pan rack adapted to receive a strap of pans, a plurality of nozzles positioned therebeneath and spaced to discharge into the several pans of a strap supported on said rack, a grease supply source, a steam supply source, connections between each of said supply sources and said nozzles, a control valve in each of said connections, a movable bar positioned to be engaged by pans supported on said rack in operative relation to said nozzles, and means operable by movement of said bar, upon pressure upon said pans, to open and to close said control valves.

8. In a machine for greasing baking pans, a skeleton pan rack adapted to receive a strap of pans, a plurality of nozzles positioned therebeneath and spaced to discharge into the several pans of a strap supported on said rack, a grease supply source, a steam supply source, connections between each of said supply sources and said nozzles, a control valve in each of said connections, a movable bar positioned to be engaged by pans supported on said rack in operative relation to said nozzles, means operable by movement of said bar, upon pressure upon said pans, to open and to close said control valves, and means in the mechanism between said bar and the valve for adjusting the relative timing of the opening and closing of the two valves.

9. In a machine for greasing baking pans, a pan rack including a longitudinal member adapted to receive an end of a pan supported on said rack, a nozzle positioned to discharge into a pan thus supported, a supply source and a connection between said source and nozzle, a control valve including a vertically movable control member, and means for depressing said control member to place said nozzle in communication with its supply source comprising a longitudinal bar pivotally supported to lie slightly above the plane of the pan rack, and spaced from the longitudinal member of said rack to underlie and be engaged by the opposite end of a pan supported thereon, a lever engaged by a free end of said bar, a bar guided for vertical movement and positioned above said valve control member to engage the same, and positioned for engagement by said lever, to be depressed thereby upon the application of pressure to said bar.

10. In a machine for greasing baking pans, a pan rack including a longitudinal member adapted to receive an end of a pan supported on said rack, a nozzle positioned to discharge into a pan thus supported, a supply source and a connection between said source and nozzle, a control valve including a vertically movable stem, and means for depressing said control member to place said nozzle in communication with its supply source comprising a longitudinal bar pivotally supported to lie slightly above the plane of the pan rack, and spaced from the longitudinal member of said rack to underlie and be engaged by the opposite end of a pan supported thereon, a lever engaged by a free end of said bar, a bar guided for vertical movement and positioned above said stem to engage the same, and positioned for engagement by said lever, to be depressed thereby upon the application of pressure to said bar, and means for adjusting the spacing of said longitudinal member of the pan rack and said first or longitudinal bar, and relative to said nozzle.

11. In a machine for greasing baking pans, a pan rack including a longitudinal member adapted to receive an end of a pan supported on said rack, a nozzle positioned to discharge into a pan thus supported, a supply source and a connection between said source and nozzle, a control valve including a vertically movable control member, and means for depressing said control member to place said nozzle in communication with its supply source comprising a longitudinal bar pivotally supported to lie slightly above the plane of the pan rack, and spaced from the longitudinal member of said rack to underlie and be engaged by the opposite end of a pan supported thereon, a lever engaged by a free end of said bar, a bar guided for vertical movement and positioned above said valve control member to engage the same, and positioned for engagement by said lever, to be depressed thereby upon the application of pressure to said bar, and means for adjusting said longitudinal bar towards and from the longitudinal member of the pan rack.

12. In a machine for greasing baking pans, a pan rack including a longitudinal member adapted to receive an end of a pan supported on said rack, a nozzle positioned to discharge into a pan thus supported, a supply source and a connection between said source and nozzle, a control valve including a vertically movable control member, means for depressing said control member to place said nozzle in communication with its supply source comprising a longitudinal bar pivotally supported to lie slightly above the plane of the pan rack, and spaced from the longitudinal member of said rack to underlie and be engaged by the opposite end of a pan supported thereon, a lever engaged by a free end of said bar, a bar guided for vertical movement and positioned above said valve control member to engage the same, and positioned for engagement by said lever, to be depressed thereby upon the application of pressure to said bar, and means for adjusting said longitudinal member of the pan rack towards and from the first or longitudinal bar.

13. In a machine for greasing baking pans, a pan rack, a nozzle positioned to discharge into a pan supported on said rack, a steam supply source and a grease supply source having connections with said nozzle, a control valve interposed between the nozzle and its respective supply source, in each of said connections, and each including a member adapted to be depressed to open said valves, a bar adapted for vertical movement spanning said valve members, and means including a second bar normally lying slightly above the pan rack and disposed to be contacted and moved by movement of a pan positioned upon said rack, to depress said first bar, thereby to open both said valves.

14. In a machine for greasing baking pans, a pan rack, a nozzle positioned to discharge into a pan supported on said rack, a steam supply source and a grease supply source having connections with said nozzle, a control valve interposed between the nozzle and its respective supply source, in each of said connections, and each including a member adapted to be depressed to open said valves, a bar adapted for vertical movement spanning said valve members, and means including a second bar normally lying slightly above the pan rack and disposed to be contacted and moved by movement of a pan positioned upon said rack, to depress said first bar, thereby to open both said valves, and a bolt adjustable in said first bar towards and from each of said valve members, to vary the relative time of opening of one valve relative to the other.

15. In a machine for greasing baking pans, a pan rack, a nozzle positioned to discharge into a pan supported on said rack, a steam supply source and a grease supply source having connections with said nozzle, a control valve interposed between the nozzle and its respective supply source, in each of said connections, and each including a member adapted to be depressed to open said valves, a bar adapted for vertical movement spanning said valve members, and means including a bar disposed longitudinally of and pivotally supported in said pan rack to lie normally slightly above the plane thereof, for engagement by a pan supported thereon, and a lever operatively engaged by the free end of said bar to be depressed thereby, and itself engaging said first bar, said second bar having means for positioning a pan longitudinally thereof with respect to said nozzle.

16. A machine for greasing baking pans and the like comprising a grease supply source, a steam supply source, a pan rack, a grease lateral and a steam lateral each connected to its respective supply source, two nozzles, one communicating with each of said laterals, and disposed to project material upon a pan positioned on said rack, a grease and a steam duct extending between the corresponding ports of each of said nozzles, and steam and grease supply control means operable by movement of a pan to discharge steam and grease from both of said nozzles.

17. In a machine for greasing baking pans and the like, a grease supply pipe and a fluid pressure supply pipe, two nozzles, each having fluid pressure and grease passages, one having its grease passages in direct communication with the grease pipe and the other having its fluid pressure passages in direct communication with the fluid pressure pipe, and a duct connecting the grease passages of the first nozzle with the grease passages of the second, and a second duct connecting the fluid pressure passages of the second nozzle with the like passages of the first nozzle.

18. In a machine for greasing pans, a pair of nozzles each having two separate passages, means connecting each of the passages in each nozzle with the like passages in the other nozzle, a duct connecting one passage in one nozzle with one supply source, and a second duct connecting the other passage in the second nozzle with a second supply source.

19. In a machine for greasing pans, a pair of nozzles each having two separate passages, means connecting each of the passages in each nozzle with the like passages in the other nozzle, a duct connecting one passage in one nozzle with one supply source, a second duct connecting the other passage in the second nozzle with a second supply source, and means in each nozzle for closing off the supply source to which said nozzle is connected.

20. In a machine for greasing baking pans, a steam lateral and a grease lateral each having a connection to its respective supply source, a plurality of nozzles on each of said laterals and having direct supply connection to that lateral on which it is mounted, each of said nozzles having separate grease and steam passages, and ducts connecting the nozzles on the steam lateral in pairs with the nozzles on the grease lateral, one duct connecting the steam passages of both nozzles of the pair, and another connecting the grease passages of both nozzles.

21. In a machine for greasing baking pans, a steam lateral and a grease lateral each having a connection to its respective supply source, a plurality of nozzles on each of said laterals and having direct supply connection to that lateral on which it is mounted, each of said nozzles having separate grease and steam passages, and ducts connecting the nozzles on the steam lateral in pairs with the nozzles on the grease lateral, one duct connecting the steam passages of both nozzles of the pair, and another connecting the grease passages of both nozzles, and a cut-off valve interposed between each nozzle and the lateral to which it is directly connected, the duct to the other nozzle of the pair being connected beyond said valve from the lateral, to be cut off thereby.

22. In a machine for greasing baking pans, a grease supply source, nozzles directly communicating therewith, a steam supply source, other nozzles directly communicating therewith, means interconnecting said nozzles in pairs to permit the discharge of steam and grease from each, a pan rack positioned so that materials discharged from said nozzles are received upon pans supported on the rack, and means independent of said pan rack and operable as a pan is deposited on the rack to spray grease from the nozzles upon the pans.

23. In a pan greasing machine, a grease supply source, a fluid pressure supply source, a valve in each source, nozzles from which the grease and fluid pressure medium are projected upon the pans, and means operable at will to open first the fluid pressure valve to cleanse the pans, and then the grease valve to grease them.

24. The method of preparing baking pans for use which comprises the steps of applying to the pans in succession live steam to cleanse and sterilize them, grease in liquid form to coat them, and finally live steam to spread the applied grease.

25. The method of preparing baking pans for use by means of a nozzle having liquid grease and fluid pressure connections, which method consists in first discharging a hot fluid pressure medium from said nozzle upon the pan to cleanse and sterilize it, then applying grease through said nozzle by means of the pressure medium as a vehicle, and finally applying the hot fluid medium only through the nozzle to spread the grease film over the pan surfaces.

26. In combination with an apertured supply pipe, a nozzle supported thereon and having passages communicating with said aperture, said nozzle having passages separate from said first passage, and having a lateral supply connection to said second passages, and means for closing said first passages without closing the second passages or the supply connection thereto.

27. A greasing machine for baking pans and the like, comprising a grease supply source, a fluid pressure supply source, a nozzle in communication with both of said sources, a valve controlling the supply from each of said sources to the nozzle, a pan rack, and means independent of said rack and operable as a pan is deposited upon the rack for opening first the fluid pressure valve, then the grease valve, and then closing said valves in the reverse order.

28. In a pan greasing machine, a steam lateral and a grease lateral, nozzles having steam and grease discharge orifices supported upon each of said laterals and each nozzle having means connecting it with the opposite lateral, a grease supply source, and a steam supply source, each connected to its respective lateral, a cross-over connection between said laterals at their ends opposite such supply sources, a normally closed valve in said cross-over connection, and control valves interposed in said laterals between the respective sources and said nozzles.

29. In a pan greasing machine, a steam lateral and a grease lateral, nozzles having steam and grease discharge orifices supported upon each of said laterals and each nozzle having means connecting it with the opposite lateral, a grease supply source, and a steam supply source, each connected to its respective lateral, a cross-over connection between said laterals at their ends opposite such supply sources, a normally closed valve in said cross-over connection, control valves interposed in said laterals between the respective sources and said nozzles, and individuals manually-operable valves interposed between each nozzle and the laterals connecting thereto, whereby the several nozzles may be individually cut off from the laterals.

30. In a pan greasing machine, a steam lateral and a grease lateral parallel thereto, a plurality of nozzles upon each of said laterals, each nozzle having steam and grease discharge orifices and each nozzle having passages connecting the corresponding discharge orifices with the lateral upon which it is supported, ducts connecting said nozzles in pairs and affording communication between the nozzle upon the steam lateral and the steam orifices of the nozzle upon the grease lateral, and vice versa, said pairs of nozzles being spaced to correspond with the standard spacings between pans strapped in sets, and each nozzle having an individual control valve which may be closed at will, whereby the spacing of the active nozzles may be varied to correspond with the spacing of the pans to be greased, and a valve in each nozzle for cutting off communication at will with its supporting lateral.

31. In a pan greasing machine, a steam lateral and a grease lateral parallel thereto, a plurality of nozzles upon each of said laterals, each nozzle having steam and grease discharge orifices and each nozzle having passages connecting the corresponding discharge orifices with the lateral upon which it is supported, ducts connecting said nozzles in pairs and affording communication between the nozzle upon the steam lateral and the steam orifices of the nozzle upon the grease lateral, and vice versa, said pairs of nozzles being spaced to correspond with the standard spacings between pans strapped in sets, and each nozzle having an individual control valve which may be closed at will, whereby the spacing of the active nozzles may be varied to correspond with the spacing of the pans to be greased.

Signed at Victoria, Province of British Columbia, Dominion of Canada, this 14th day of April, 1927.

ROBERT MORTON.